US006247259B1

United States Patent
Tsadka et al.

(10) Patent No.: US 6,247,259 B1
(45) Date of Patent: Jun. 19, 2001

(54) METHOD AND APPARATUS FOR FIRE CONTROL

(75) Inventors: Sagie Tsadka, Yavne; Ehud Azoulay, Rosh-Ha'ayin; Gideon Bar-Tal, Ranana, all of (IL)

(73) Assignee: The State of Israel, Atomic Energy Commission, Soreq Nuclear Research Center (IL)

( * ) Notice: Subject to any disclaimer, the term of this patent is extended or adjusted under 35 U.S.C. 154(b) by 0 days.

(21) Appl. No.: 09/168,258

(22) Filed: Oct. 8, 1998

(30) Foreign Application Priority Data

Oct. 9, 1997 (IL) ........................................................ 121934

(51) Int. Cl.$^7$ ....................................................... F41G 1/36
(52) U.S. Cl. ........................... 42/103; 89/41.06; 89/41.17
(58) Field of Search ............................... 42/103; 89/41.17, 89/41.06

(56) References Cited

U.S. PATENT DOCUMENTS

| 4,182,570 |   | 1/1980  | Courrier et al. ........................ 356/28   |
| 4,695,161 | * | 9/1987  | Reed ..................................... 356/254 |
| 4,993,833 | * | 2/1991  | Lorey et al. .......................... 356/252   |
| 5,123,730 |   | 6/1992  | Holmes et al. ...................... 356/28.5    |
| 5,374,986 | * | 12/1994 | Solinsky ............................. 89/41.17   |

FOREIGN PATENT DOCUMENTS

| 3439068 | * | 1/1986 | (DE) .................................... 89/41.17 |

OTHER PUBLICATIONS

R.S. Lawrence, G.R. Ochs, and S.F. Clifford, Use of Scintillations to Measure Average Wind Across a Light Beam, Applied Optics, vol. 11, No. 2, Feb. 1972, pp. 239–243.

Ting–I Wang, G.R. Ochs, and R.S. Lawrence, "Wind measurements by the temporal cross–correlation of the optical scintillations," Applied Optics, vol. 20, No. 23, Dec. 1, 1981, pp. 4073–4081.

J. Fred Holmes, Farzin Amzajerdian, Rao V.S. Gudimetla, and John M. Hunt, "Remote sensing of atmospheric winds using speckle–turbulence interaction, a $CO_2$ laser, and optical heterodyne detection," Applied Optics, vol. 27, No. 12, Jun. 15, 1988, pp. 2532–2538.

Robert W. Byren, "Laser Rangefinders," Chapter 2, vol. 6, "Active Electro–Optical Systems," The Infrared & Electro–Optical Systems Handbook, Clifton S. Fox, Ed., SPIE Press, 1993, pp. 79–114.

* cited by examiner

Primary Examiner—Stephen M. Johnson
(74) Attorney, Agent, or Firm—Lerner, David, Littenberg, Krumholz & Mentlik, LLP

(57) ABSTRACT

A method for the fire control of flat trajectory weapons, which comprises the steps of measuring the target range and cross wind velocity along the intended projectile trajectory prior to firing the weapon and, using the know ballistic equations of the projectile, determining the expected vertical and horizontal deflection of the projectile and adjusting the weapon sight to compensate for said deflections.

11 Claims, 8 Drawing Sheets

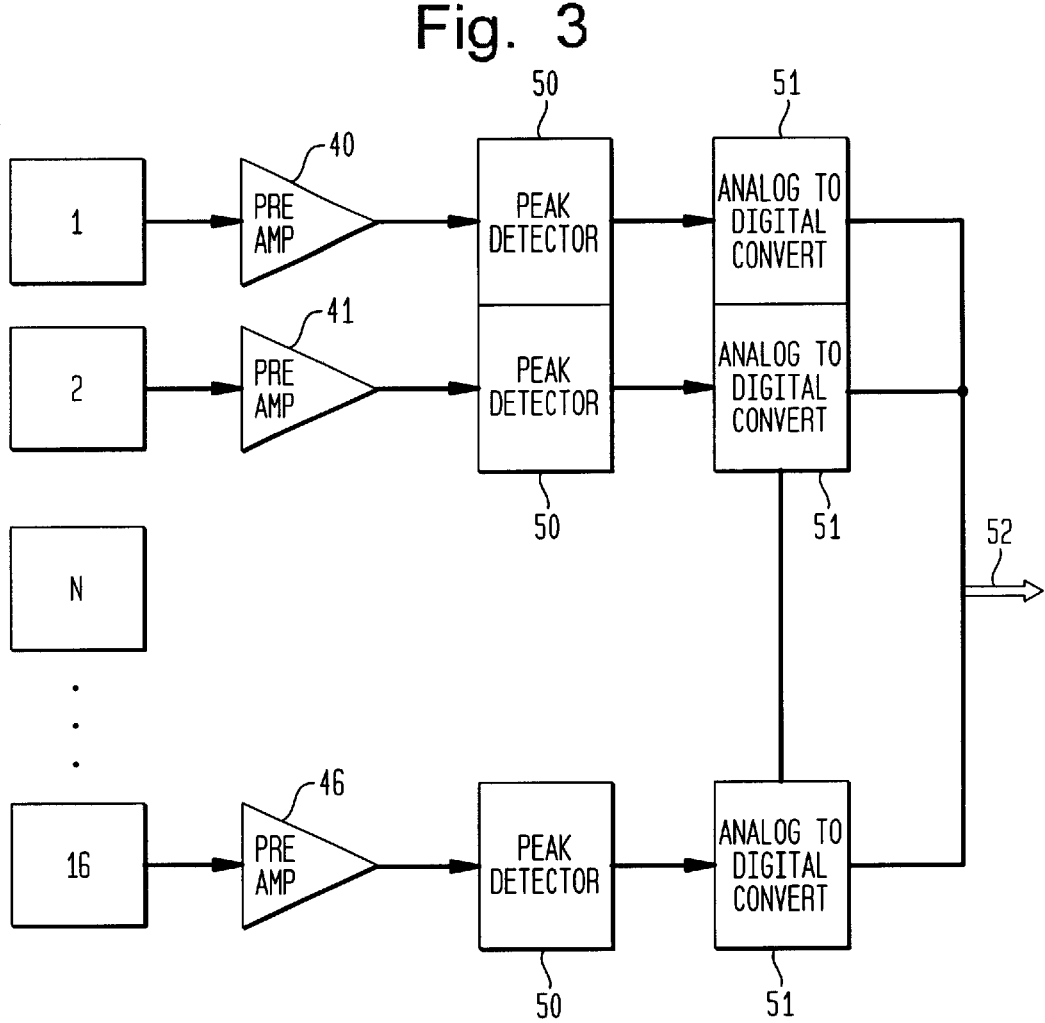

METHOD AND APPARATUS FOR FIRE CONTROL

FIELD OF THE INVENTION

This invention relates to methods and apparatus of fire control systems (FCS) for trajectory weapons of many types, particularly of miniaturized such systems for directing the fire of small arms, such as rifles, rocket launchers and grenade launchers.

BACKGROUND OF THE INVENTION

The accurate firing of trajectory weapons requires that the range of the target be determined as accurately as possible, and that account should be taken of crosswind along the projectile trajectory. The first factor affects the required position of the weapon axis in the vertical plane, while the second affects its position in the horizontal plane. Since aiming weapons, particularly small-sized ones, requires aligning the weapon sight aiming point (such as crosshair, red dot etc.) with the target, it is desirable to shift the sight aiming point to account for the target range and the trajectory deviations due to crosswind. The art does not provide a satisfactory method and apparatus, particularly applicable to small-sized arms, for permitting the shooter to displace the side aiming point or method and apparatus for automatically displacing said side aiming point, according to target range and crosswind velocity.

Determination of the target range from a given base point, wherein the term "target" does not have a military significance, but can indicate any object the range of which it is desired to determine, by projecting onto the target a laser beam and measuring the time interval between the emission of the laser pulses and the reception of the corresponding echoes received at the base point, due to the reflection of the laser beam from the target, is known in the art. Determination of the crosswind intensity by means of laser beams has been recently proposed.

R. S. Lawrence et al, in Applied Optics, Vol. 11, No. 2, pp. 239–243, describes the use of laser scintillation patterns to measure average wind speed.

U.S. Pat. No. 5,123,730 describes an apparatus which comprises a light source, and a beam splitter for splitting a beam of light into a first transmitted beam segment, and a seconds low beam. A mechanism is provided for shifting the frequency of one or both beam segments and for directing the first beam segment to a target. A remote target for scattering the first beam is provided, said remote target being, for example, aerosol. A mechanism is provided for combining the scattered first beam segment returning from the target and the second beam segment into a combined beam and detecting the combined beam. A detector is operative to generate a sign indicative of crosswind along the path of the reactive first beam segment. A mechanism for determining wind speed normal to the path from the generated signal is also provided. Such a mechanism, while useful for meteorological determinations, cannot provide fire control.

Ting-1 Wang et al, in Applied Optics, Vol. 20, No. 23, pp. 4073–4081, discusses various methods of correlation analysis usable to deduce crosswind from a drifting scintillation pattern, and conclude that no technique is ideal, but suggest to use a technique based on the cross-co variance function, of which they give a mathematical analysis.

U.S. Pat. No. 4,182,570 discloses a device for measuring a component of wind speed, which comprises a laser generator suitable for emitting a laser beam towards a target, two photo-electric receivers located transversely with respect to the initial axis of the laser generator to receive a part of the energy of said beam, and a circuit for processing the electrical signals delivered by the receivers to determine the slope of the origin of the normalized covalence function corresponding to said signals, the slope being representative of the component of the speed of wind blowing in the path of a laser beam in the direction of the straight line passing through the receivers, wherein the laser generator includes means for emitting said beam in successive groups of two pulses, the pairs of pulses being separated by a predetermined time interval, and wherein the receivers are so disposed in the proximity of the generator that each receives an echo of the laser pulses returned by the target. It is stated in said patent that the device can be applied to an artillery firing control system, but such an application is not described, nor are any instructions given for carrying it into practice.

J. Fred Holmes et al, in Applied Optics, Vol. 27, No. 12, pp. 2532–2538, describe the use of speckle-turbulence interaction to measure the vector wind in a plane perpendicular to a line of sight from a laser transmitter to a target.

It is an object of this invention to provide a firing control system (FCS) that is more accurate than any such system provided by the art.

It is another object of this invention to provide an FCS method and device that is applicable to all flat trajectory weapons, particularly to small arms.

It is a further purpose of this invention to provide a device for FCS which is of small size—"miniaturized"—and therefore applicable to portable weapons.

It is a still further purpose of this invention to provide a method and apparatus which permit the shooter of a weapon, particularly a small weapon, to adjust the weapon sight so to compensate for deviations due to crosswind along the intended projectile trajectory.

It is a still further purpose of this invention to provide a method and apparatus which permits automatically to displace the sight aiming point to compensate for crosswind and drop of the bullet along the trajectory.

Other purposes and advantages of this invention will appear as the description proceeds.

SUMMARY OF THE INVENTION

The fire control method of the invention comprises the steps of measuring the target range and crosswind velocity along the intended projectile trajectory prior to firing the weapon and, using the known ballistic equations of the projectile, determining the expected vertical and horizontal deflection of the projectile and adjusting the weapon sight to compensate for said deflections.

The invention relates particularly to flat trajectory weapons, in respect to which the projectile trajectory can be assimilated, for practical purposes, to the line of sight from the gunsight to the target, so that it should be understood that, when reference of said trajectory is made hereinafter, reference could have been made instead, if the context permits, to that said line of sight, and vice versa.

More specifically, said method comprises, prior to firing the weapon, the steps of:

a - generating a laser beam at the firing position;

b - receiving the beam reflected by the desired target;

c - determining the target range by measuring the time lag between the generation of said laser beam and the reception of said reflected beam (viz. the double pass time of flight of the laser pulse between transmitter and target). Methods for effecting such a determination, which can be used in carrying the present invention into practice, are described, e.g., in The Infrared Electro-Optical Systems Handbook, Volume 6: "Active Electro-Optical Systems", Clinton S. Fox Editor, SPIE Press 1993, USA.;

d - determining the crosswind direction and velocity along the trajectory by receiving said reflected laser beam in two separate positions and measuring the intensity fluctuations of said beam in said two separate positions;

e - determining, using the ballistic equations of the projectile, the expected vertical and horizontal deflection of the projectile; and f - adjusting the weapon sight to compensate for said deflections, either by a) providing the shooter with sufficient information to adjust the sight of the weapon as required by said deflections, or b) automatically adjusting said sight. In either case the apparatus will be provided with corresponding means The communication to the shooter of said information can be effected for example by displaying in an alpha-numeric monitor, embedded in the field of view of the gunsight, the direction and the number of notches by which the gunsight aiming point is to displaced, whereby the shooter will so displace it. Said direction and number of notches are determined by means of a processor or microcomputer which stores, in a memory, the ballistic equations of the projectile, receives as inlet the target range and crosswind direction and velocity, determined as set forth hereinbefore, and calculates the expected vertical and horizontal deflections of the projectile and the corresponding adjustment of the gunsight aiming point, required to compensate for them, on the basis of said ballistic equations. The automatic adjustment of the gunsight can be effected by enabling said processor or microcomputer to control the position of the aiming point and to effect its displacement directly. Persons skilled in the art can easily effect either of said ways of adjusting the weapon sight.

In a particular embodiment, the method of the invention includes obtaining an accurate measurement of the intensity of the crosswind vector in distinct section of the path—hereinafter sometimes called "(RR)" crosswind measurement—and not only its average value, whereby a better prediction of the horizontal deflection of the target due to crosswind along the trajectory is obtained, since crosswind affects the projectile differently in various sections of the trajectory, and particularly for supersonic projectiles, the same crosswind produces a greater firing error (deviation from the target) if it is closer to the firing point and a decreasing error as the projectile nears the target.

The apparatus according to the invention comprises:

a laser beam transmitter;

two spaced detectors, each with its own collecting optics and with a field of view covering the target, wherein, desirably, the apertures of the collective optics partly overlap;

means for determining the range of the target, based on the time lag between the emission of the laser beam and the reception of the beam reflected from the target;

means for processing the output (analog) signal of each detector and determining from said signals the average crosswind direction and intensity along the intended projectile trajectory; and means for determining, from said determined range and said detector output signals, the required adjustment of the gunsight.

In a particular embodiment of the invention, wherein range-resolved crosswind measurement is carried out, the apparatus preferably includes a multi-element single receiver instead of two separate detectors. A structure of a specific multi-element single receiver will be described hereinafter.

According to a preferred embodiment of the invention, the apparatus is so miniaturized that it can be applied to a portable weapon, such as a rifle.

BRIEF DESCRIPTION OF THE DRAWINGS

In the drawings:

FIG. 3 is a schematic illustration of a particular multi-element single receiver which is part of an apparatus according to an embodiment of the invention;

DETAILED DESCRIPTION OF PREFERRED EMBODIMENTS

Figure 1:
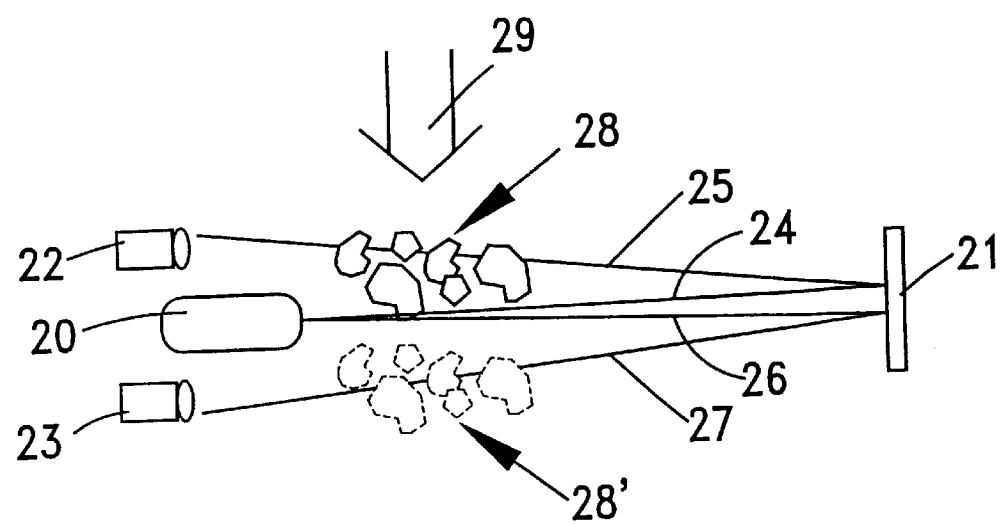
FIG. 1 schematically illustrates the operation of the apparatus according to the invention.

The invention uses a configuration of a transmitter-receiver unit that transmits a laser beam towards a natural diffused target (hillside, building wall, etc.) and detects the laser intensity that is back-reflected from the target, from which it can extract and compute the average crosswind velocity and direction between the transmitter-receiver unit and the target. The system can measure the range to the target by measuring the double pass time of flight of the laser pulse between the transmitter and the target. The effective range of operation of the system is 50–1000 meters. The accuracy for the measured average crosswind velocity is better than 1 m/sec. The range measurement accuracy is better than ±10 m.

Crosswind along a path can horizontally deflect any projectile or rocket, shot towards a specific target, from the desired hit point at the target. Target range uncertainty can bring to vertical deflection of the projectile or rocket from the desired hit point at the target. By measuring these two parameters prior to shooting, and by using the known ballistic equations of the projectile, it is possible to compute the expected vertical and horizontal deflection of the projectile. The system of the invention, therefore, can give the shooter a correction of the aim point, which will compensate for the expected deflection of the projectile, and will improve significantly the accuracy of shooting. Generally, the correction of the aim point is effected by a displacement of the aiming point in the gunsight The apparatus of the invention can be utilized as Fire Control System (FCS) of reduced size (or, as will sometimes be said, a "miniaturized" apparatus) so as to be mounted on the weapon, even if it is a portable weapon. It is applicable to many types of flat trajectory weapons, some examples of which are:

1. Anti-tank rocket launcher
2. Snipers' rifle
3. Tank shooting
4. Grenades launcher.

The miniaturized apparatus will be mounted on the weapon and will function as a smart weapon sight for the shooter. The FCS will include the sighting optics of the shooter (telescope) together with the laser unit that measures the crosswind and range to the target. The shooter will aim the scope to the target (or to any object in the vicinity of the target) and then press a button, which will trigger the operation of the laser unit. The laser unit will measure the crosswind along the path and the accurate range to the target. The FCS processing unit will include computer means programmed according to the type of weapon being used, and the type of projectile and its ballistic equations. The computer means will receive as input the crosswind and range data and process them to compute the corresponding horizontal and vertical deflection of the projectile at the target and the gunsight adjustment, generally the aiming point displacement, required to compensate for said deflections and cause the projectile to hit the target. The term "projectile" is this specification and claims includes rockets and should be so construed whenever it appears. Further, while reference will always be made hereinafter to gunsight adjustment effected by displacing the gunsight aiming point, it should be understood that this is not a limitation and any other means of gunsight adjustment are included in the invention.

After the laser and processing units complete their missions, there are two methods to effect the gunsight adjustment:

1. Display on a small alpha-numeric monitor, embedded in the field of view of the sight, the number of notches and the direction in which the shooter should move his aim point, in order to compensate for the crosswind and drop of bullet along the trajectory.

2. Displace automatically the gunsight aiming point, in a way that will enable the shooter to hit the target, regardless of said crosswind and bullet drop.

The type of picture and aiming point that the shooter can see is either a real "live" picture from a regular optical sight, where the aiming point is projected into the line of sight of the shooter, or a TV type of picture where the aiming point is electronically manufactured and presented on the monitor.

The laser transmits a collimated narrow beam towards a distant target. The beam is back reflected from the target, and the returned intensity is collected and detected by the receiver of the system. The receiver is composed of two spaced detectors, each has its own focusing lenses, or a joint focusing lens for both detectors, where the distance between the centers of the lenses is for example 2–4 centimeters. Since the beam passes the atmospheric turbulence in its way from the transmitter to the target and back from the target to the receiver, it accumulates intensity fluctuations across its phase front, due to the diffraction of the refractive-index irregularities that comprise the turbulent medium. According to Taylor's hypothesis (the "frozen" turbulence hypothesis), for short time periods, it is accepted that the refractive-index irregularities drift with the atmospheric wind with no significant change in their shape or spatial distribution. Therefore, the diffraction pattern of the beam on the target and on the receiver plane also drifts with a velocity that is related to the crosswind component along the optical path. By temporarily analyzing the intensity fluctuations, in two separate positions on the receivers plane, it is possible to compute the crosswind velocity. Measuring the intensity fluctuations in separate positions on the receiver plane is accomplished by using the geometry of two spaced detectors in the focal plane of the receivers optics.

FIG. 1 schematically illustrates the determination of crosswind velocity in an apparatus according to the invention. Numeral 20 indicates a laser transmitter, which generate a laser beam directed to a target 21. 22 and 23 are two detectors situated on the focal plane of the receiver optics and spaced from one another. The laser beam is reflected to detector 22 as indicated at 24 and 25 and to detector 23 as indicated at 26 and 27. 28 indicates a turbulence which drifts because of a crosswind, directed as indicated by arrow 29. After a time delay, which depends on the distance between the two detectors and on the velocity of the crosswind, the turbulence has drifted to the position indicated in broken lines at 28'. Detector 22 detects an intensity picture of the reflected laser beam. After said delay, detector 23 detects approximately the same intensity picture of the reflected laser beam. Since the distance between the two detectors is fixed and known, the delay depends only on the velocity of the crosswind.

Figure 2:
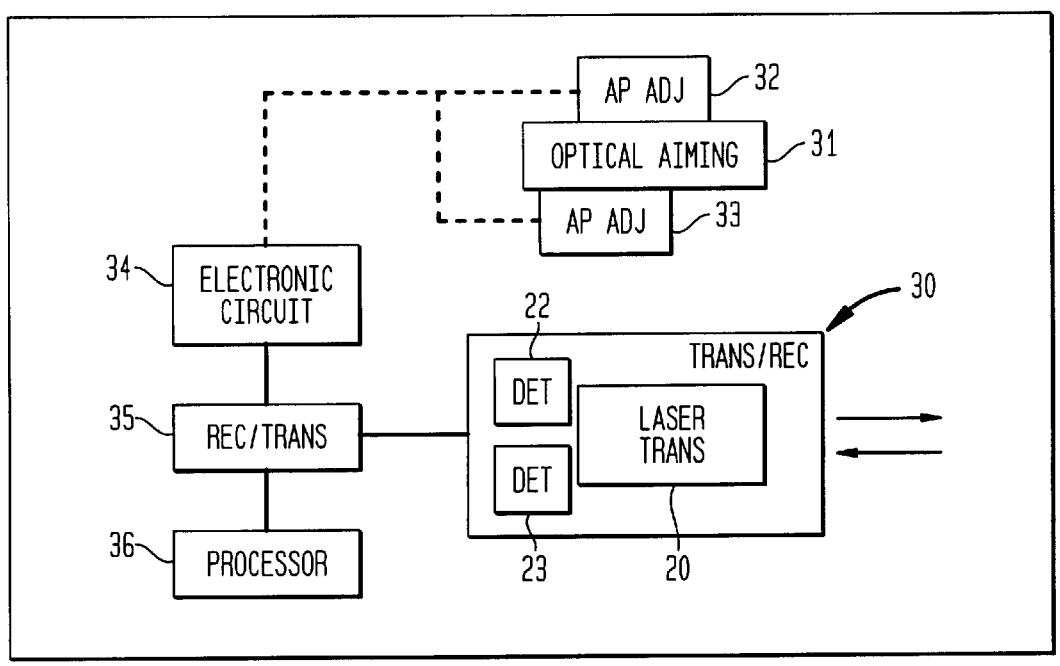
FIG. 2 is a schematic illustration of the general structure of an apparatus according to an embodiment of the invention.

Correspondingly, FIG. 2 schematically illustrates the general structure of an apparatus according to an embodiment of the invention. Numerals 20, 22 and 23 respectively designate, once again, a laser transmitter and two detectors, which constitute a transmitter/receiver unit 30. Numeral 31 indicates an optical aiming device, essentially a telescope, which is provided with means, schematically indicated at 32 and 33, for adjusting its aiming point in direction and in elevation, respectively. 34 is a unit comprising the required electronic components and circuits. 35 is a unit that receives the signals from the detectors and transmits them to a processor 36, which determines the target range from the time delay between the emission of a the laser beam and the detection of its reflection from the target, in a known manner, and determines the crosswind velocity as explained in connection with FIG. 1. The processor calculates the required adjustments of the gunsight and transmits the calculated data to electronic unit 34, which displays said data to the shooter to permit him correspondingly to adjust the gunsight or affects the adjustment automatically.

The laser preferably transmits short pulses (pulse width about ~40 nanoseconds FWHM) at a high repetition rate (about ~1 Khz) and low total energy per pulse (about ~100 $\mu$J). These laser parameters give high peak power per transmitted pulse (a few kilowatts) at a high enough pulse rate which, together with an aperture receiver optics of a size sufficient for collecting the amount of light needed, and are suitable for measuring the crosswind velocity for any target range that is not greater than the maximum range in which the system is intended to operate. The above preferred data, however, are valid under the assumption of target's reflectivity values of 0.05–0.1, which are the minimum reflectivity values expected to be derived from natural or artificial objects. However, different terrains, natural or artificial objects, may have reflectivity values as high as 0.6–0.7, and if these exceed 0.1, different pulse width, frequency and range, will preferably be adopted and the skilled persons will easily determine, in each case, the most suitable ones.

The following steps are carried out, in a preferred embodiment of the invention, for measuring the crosswind:

1. A Nd:YLF diode pumped laser with beam diameter <5 cm and narrow beam divergence (<0.2 mrad) is used to produce the laser beam.

2. A distant target, of the diffusive type, is aimed at and ~1000 pulses at repetition rate of >1 Khz are sent to it.

3. The intensity of the light reflected from the target is detected with two spaced detectors, each with its own or joint collecting optics, and with a field of view covering the spot at the target (>>0.2 mrad), and having such a distance between the centers of their collecting optics that their apertures partially overlap (viz. larger than the distance between the centers of the two optics apertures), e.g. in the range of 1–4 cm. To achieve this feature, it is preferred to use a 45° beam splitter in the entrance pupil of the system, that can split the received light into two perpendicular beams, each with the same spatial and temporal characteristics, besides the intensity, that is half the original intensity.

4. The output (analog) signal of each detector is processed by amplifying the signal, selecting the peak values of each signal, converting the analog to a digital signal, and inputting the digitized data into computer means.

5. Two arrays the peak values of each detector (each array contains up to 1000 values) are saved.

6. The average and normalized variance of each one of the arrays is computed.

7. The normalized time-lagged Cross-Correlation Function (CCF) between the intensity values in the two arrays, with time lag of up to ±20 msec, is calculated and built.

8. The cumulative differences between the values in the positive part of the CCF to the negative part of the CCF are calculated. The sign of the result gives the direction of the average crosswind along the path (right to left or left to right).

9. The signal fluctuations in each array of values are smoothened by performing running average of 3–6 values.

10. After smoothing, is computed for each array the number of zero crossing points (number of times the instantaneous signal cross the average signal in each detector). The number of zero crossing occurrence, together with other parameters—the range to the target and the variance of the signal—gives the intensity of the average crosswind along the path, after using a proper calibration function.

The range to the target can affect the value of the average crosswind measured by the system. The signal that the detector of the system receives is influenced by the diffraction pattern of the laser light, where the diffraction pattern is produced by turbulence eddies along the range. The distance of a turbulence eddy from the receiver determines, together with the size of the eddy and the laser wavelength, the characteristic spatial scale of the diffraction pattern at the receiver plane. Therefore, the temporal spectrum of the receiver signal, which is the realization of the spatial scale drifted by the wind speed vector, is also dependent on the distance to the eddies and therefore also dependent on the range to the target. Since the number of zero crossing is a measure to the temporal spectrum of any signal, it is clear that the measured intensity of crosswind with the zero crossing method is dependent on the range to the reflecting target.

The process and apparatus of the invention can be adapted, in a particular form of the invention, to effect RR crosswind measurements. The modification of the apparatus includes the development of a multi-element single receiver (instead of the two separated detectors), a modified transmitter (same laser with a new shape of beam), and a new software version that will enable a real range-resolved measurement of the crosswind along the path.

A proposed multi-element single receiver is a linear InGaAs PIN photodiode array, schematically illustrated in FIG. 3. This is a custom monolithic photodiode array, with up to 16 elements in one row, where the detection array is mounted in a 68 pin leadless chip carrier (LCC). This detector array has a common cathode with isolated anodes indicated in FIG. 3 by numerals 1 to 16. 40 to 46 are corresponding preamplifiers, 50 indicates peak detectors. The digital signals are transmitted to a processor, as indicated at 52. The size of each detector in the array is 50 $\mu$m (width)×250 $\mu$m (height) and the pitch is 50 $\mu$m as well. A possible supplier for such an array is Sensors Unlimited Inc., New Jersey, USA.

The idea behind the multi-element approach is that movement of turbulent eddies across the laser beam, due to crosswinds in a specific section of the optical path, produces a unique temporal and spatial intensity signature in the focal plane of the receiver. By analyzing the signal of adjacent detectors in the focal plane and by using various time scales for integration of the signal, it is possible to reconstruct the specific signature and to resolve, therefore, the intensity of crosswind speed in the relevant section of the path. The technique used to determine average crosswind velocity is valid also in this case, but the CCF is calculated for different combinations of pairs of detectors in the focal plane of the receiver.

Figure 4A:
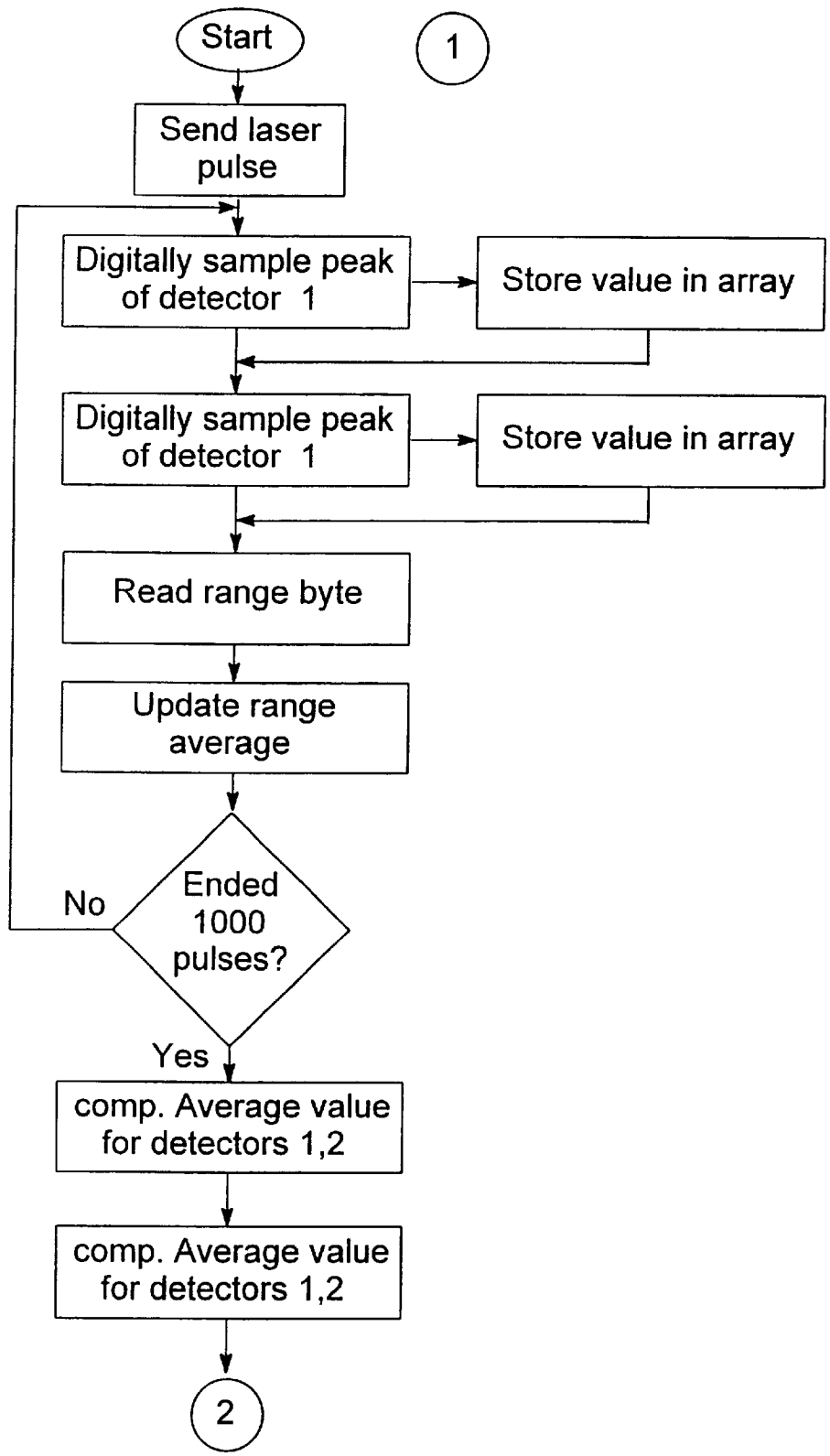
FIGS. 4a, 4b, and 4c constitute, in succession, a general flow chart of the software used in an apparatus according to an embodiment of the invention.
Figure 4B:
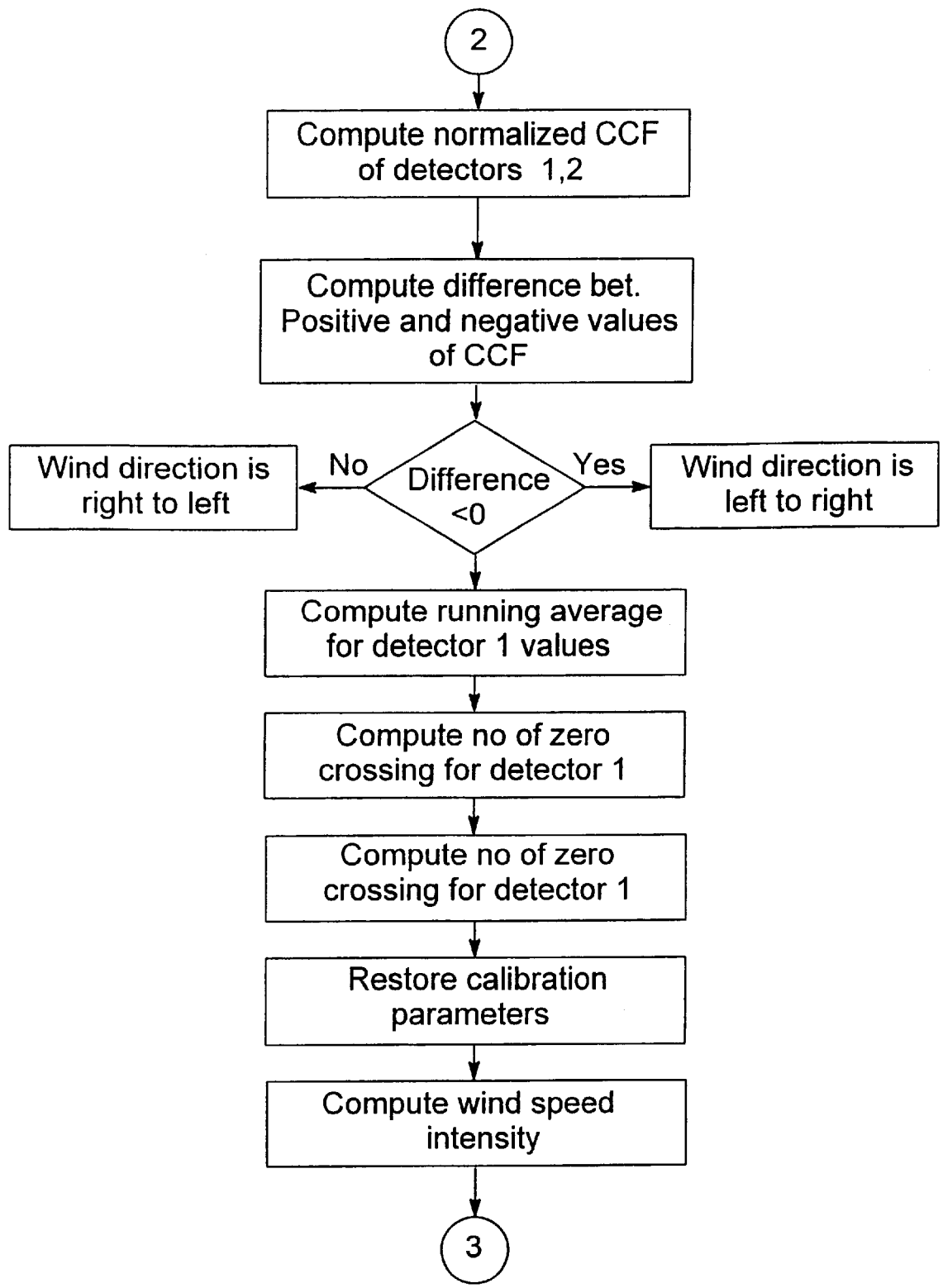
Figure 4C:
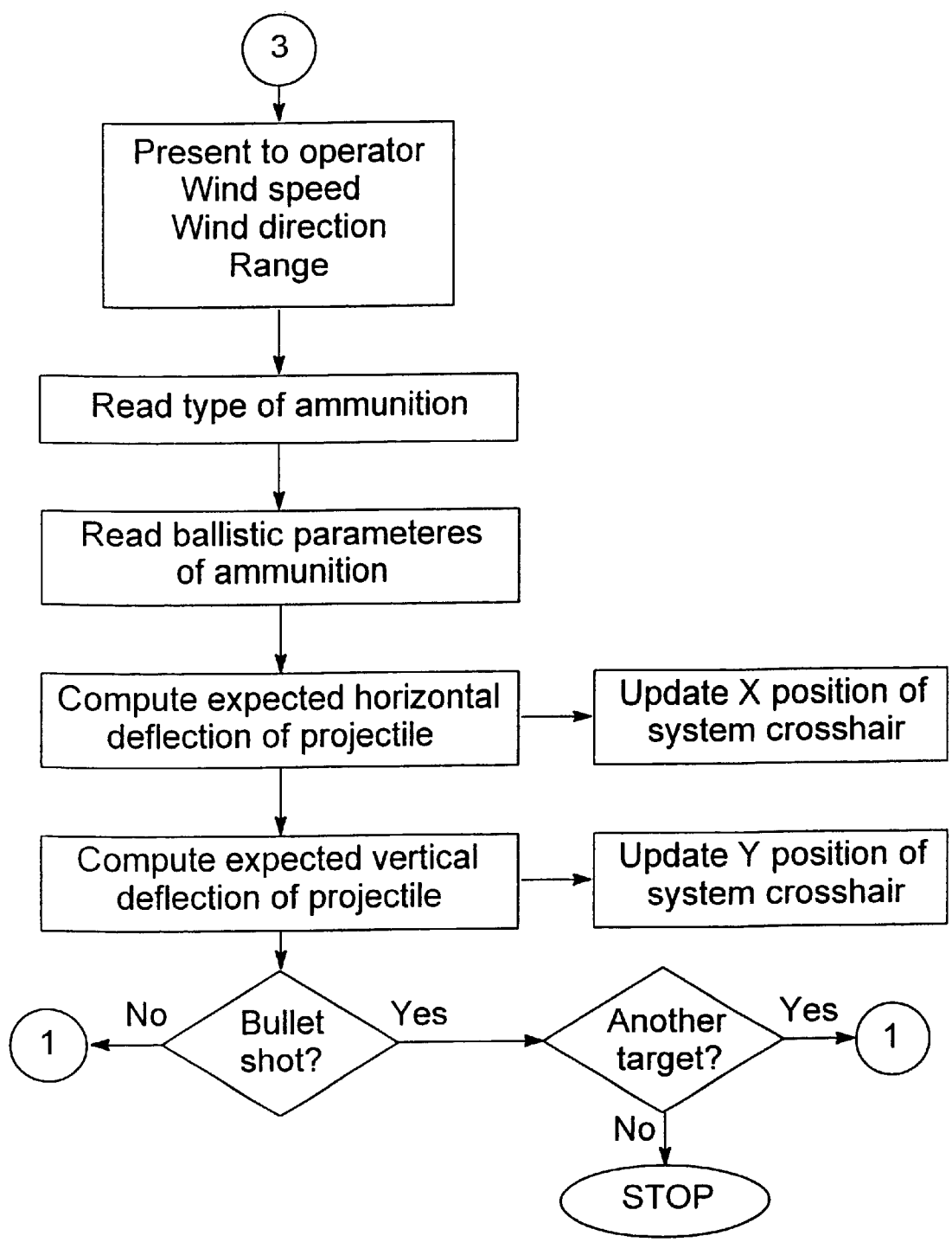

An embodiment of the software used in the apparatus of the invention is illustrated in the of FIGS. 4a, 4b, and 4c, divided into three consecutive portions because of its length, which flow diagram is self-explanatory.

Figure 5:
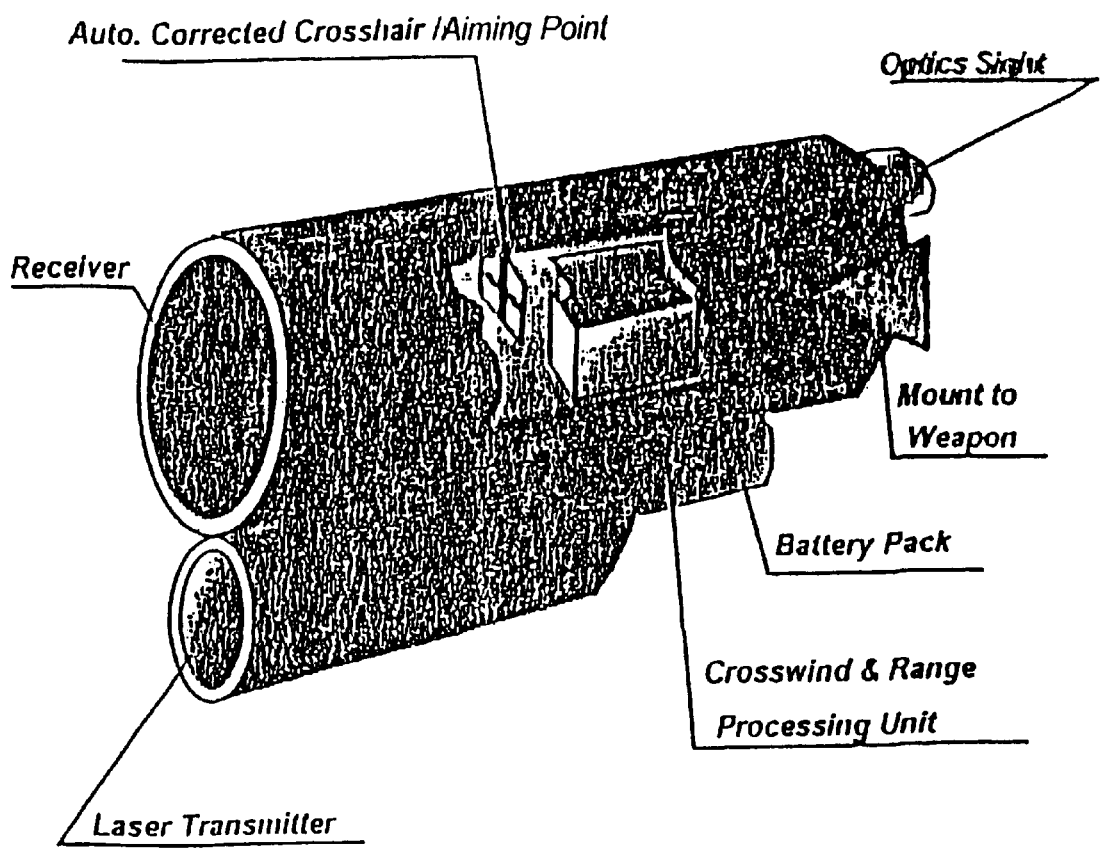
FIG. 5 is a schematic perspective view of an apparatus apparatus according to an embodiment of the invention, suitable for application to a portable weapon.
Figure 6:
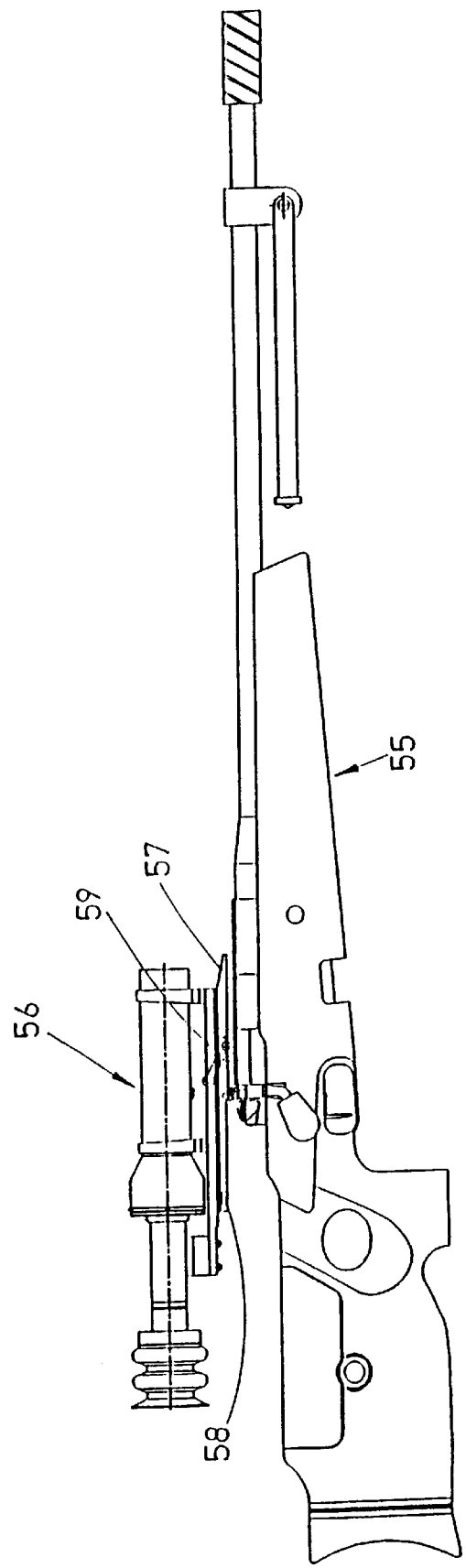
FIG. 6 is is a schematic lateral view showing the apparatus of FIG. 5 applied to a conventional rifle.

FIGS. 5 and 6 show, by way of illustration of a specific case, the application to a conventional rifle of an apparatus according to an embodiment of the invention. FIG. 5 shows the apparatus in schematic perspective, partly broken off to show the crosswind and range processing unit and the aiming point. FIG. 6 schematically shows in lateral view a rifle 55, which need not be described as it is not part of the invention and is generally conventional, to which is applied an apparatus 56 according to an embodiment of the invention. 57 is a mounting plate to which the apparatus can be attached, e.g. by means of screws, one of which is schematically indicated at 58, which plate can be attached to the rifle by means of a releasable connection, schematically indicated at 59.

While specific embodiments of the invention have been described for the purpose of illustration, it will be understood that the invention may be carried into practice by skilled persons with many modifications, variations and adaptations, without departing from its spirit or exceeding the scope of the claims.

What is claimed is:

1. Method for the fire control of flat trajectory weapons including a sight having an aiming point, said method comprising:

generating at the firing position a laser beam having a repetition rate of not less than 1 Khz;

receiving the beam reflected by a desired target;

determining the target range by measuring the time lag between the generation of said laser beam and the reception of said reflected beam;

determining the crosswind direction and crosswind velocity along the trajectory by receiving said reflected laser beam in two separate positions and measuring the intensity fluctuations of said beam in said two separate positions;

determining, using the ballistic equations of the projectile, the expected vertical and horizontal deflection of the projectile; and adjusting the aiming point contained in the weapon sight to compensate for said deflections, either by providing the weapon shooter with sufficient information to adjust said aiming point or by automatically adjusting said aiming point.

2. Method according to claim 1, wherein the crosswind direction and velocity are determined in distinct sections of the projectile trajectory.

3. Method according to claim 1, further comprising:
producing said laser beam by means of an Nd:YLF diode pumped laser with beam diameter <5 cm and narrow beam divergence less than;
aiming at a distant target, of the diffusive type, and sending to said target ~1000 laser beam pulses at repetition rate of >1 Khz;
detecting the intensity of the laser beam reflected from the target with two spaced detectors, each with its own or joint collecting optics, and with a field of view covering the target larger than 0.2 mrad, and having a distance between the centers of their collecting optics that their apertures partially overlap;
processing the analog output signal of each of said detectors by amplifying its signal, selecting the peak values of each signal, converting the analog to a digital signal, and inputting the digital signal into computer means;
saving two arrays of the peak values of each of said detectors;
computing the average and normalized variance of each one of said arrays;
calculating and building the normalized time-lagged Cross-Correlation Function between the intensity values in said two arrays;
calculating the cumulative difference between the values in the positive part of said Cross-Correlation Function to the negative part thereof, whereby the direction of the average crosswind along the path is defined by the sign of the result of said calculation;
smoothening the signal fluctuations in each array of said values by performing running average of 3–6 values; and
thereafter, computing for each of said arrays the number of zero crossing points to calculate the intensity of the average crosswind along the path.

4. Apparatus for the fire control of a flat trajectory weapon, by the adjustment of the aiming point contained in the gunsight of said weapon, said apparatus comprising:
a diode pumped laser transmitter having a repetition rate of not less than 1 Khz for emitting a laser beam towards a target, said target reflecting said laser beam;
a receiver, chosen from the group consisting of two spaced detectors and a multi-element single receiver, each with a field of view covering the desired target for receiving said reflected laser beam in two separate positions and outputting two signals;
means for determining the range of the target, based on the time lag between the emission of the laser beam and the reception of said reflected laser beam;
means for processing the signals outputted by said receiver and determining from said signals the direction and intensity of the average crosswind along the intended projectile trajectory; and
means for determining, from said range and said receiver output signals, the data required for said adjustment of the aiming point contained in said gunsight of said weapon.

5. Apparatus according to claim 4, wherein the receiver consists of two detectors which comprise collective optics the apertures of which partly overlap.

6. Apparatus according to claim 4 miniaturized so as to be applicable to a portable weapon.

7. Apparatus according to claim 4, comprising means for automatically displacing the aiming point contained in the gunsight of the weapon as a function of the determined range and of the signals outputted by the receiver.

8. Apparatus according to claim 4, comprising means for communicating to the shooter of the weapon the data required for the adjustment of the aiming point contained in the gunsight of the weapon.

9. Apparatus according to claim 8, wherein the means for communicating to the shooter of the weapon the data required for the adjustment of the aiming point contained in the gunsight of the weapon comprise means for displaying in an alpha-numeric monitor, embedded in the field of view of said gunsight, the direction and the number of notches by which said aiming point is to be displaced.

10. Method for the fire control of flat trajectory weapons including a gunsight having an aiming point, said method comprising measuring the target range and crosswind velocity along the intended projectile trajectory prior to firing the weapon; using known ballistic equations of the projectile for determining the expected vertical and horizontal deflection of the projectile and; adjusting the aiming point to compensate for said deflections, said method further including producing a laser beam by means of an Nd:YLF diode pumped laser with beam diameter less than 5 cm and narrow beam divergence less than 0.2 mrad; aiming at a distant target, of the diffusive type, and sending to said target ~1000 laser beam pulses at a repetition rate of greater than 1 Khz; detecting the intensity of the laser beam reflected from the target with two spaced detectors, each detector having its own or joint collecting optics, and having a field of view covering the target larger than 0.2 mrad, and having a distance between the centers of their collecting optics whereby their apertures partially overlap; processing an analog output signal of each of said detectors by amplifying its signal, selecting the peak values of each signal, converting the analog to a digital signal, and inputting the digital signal into a computer means; saving two arrays of the peak values of each of said detectors; computing the average and normalized variance of each of said arrays; calculating and building the normalized time-lagged Cross-Correlation Function between the intensity values in said two arrays; calculating the cumulative differences between the values in the positive part of said Cross-Correlation Function to the negative part thereof, whereby the direction of the average crosswind along the path is defined by the sign of the result of said calculation; smoothening the signal fluctuations in each array of said values by performing running average of 3–6 values; and thereafter computing for each of said arrays the number of zero crossing points to calculate the intensity of the average crosswind along the path.

11. Apparatus for the fire control of a flat trajectory weapon by adjustment of an aiming point provided in a gunsight of said weapon, said apparatus comprising a laser beam transmitter; two spaced detectors each having a field of view covering a desired target, each of said detectors providing an output signal; means for determining the range of the target based on the time lag between the emission of a laser beam from said transmitter and the reception of the beam reflected from the target; means for processing the output signal of each detector and determining from said signals the direction and intensity of the average crosswind along an intended projectile trajectory; means for determining from said range and said output signals the required adjustment of said aiming point; and means for communicating data to a shooter for the required adjustment of the aiming point, said communicating means comprising means for displaying in an alpha numeric monitor, embedded in the field of view of the gunsight, the direction and the number of notches by which the aiming point is to be displaced.

* * * * *

UNITED STATES PATENT AND TRADEMARK OFFICE
CERTIFICATE OF CORRECTION

PATENT NO. : 6,247,259 B1
DATED : June 19, 2001
INVENTOR(S) : Tsadka et al.

It is certified that error appears in the above-identified patent and that said Letters Patent is hereby corrected as shown below:

<u>Title page,</u>
Item [57], ABSTRACT, change "cross wind" to -- crosswind --, and change "know" to -- known --.

<u>Column 1,</u>
Line 46, change "seconds" to -- second, --.
Line 64, change "co variance" to -- covariance --.

<u>Column 3,</u>
Line 4, after "Infrared" insert -- & --.
Line 43, "(RR)" should read -- "range-resolved (RR)".

<u>Column 9,</u>
Line 7, after "than" insert -- 0.2MRAD --.

<u>Column 10,</u>
Line 4, change "claim 4" to -- claim 4, --.

Signed and Sealed this

Fifteenth Day of January, 2002

Attest:

Attesting Officer

JAMES E. ROGAN
Director of the United States Patent and Trademark Office